Feb. 22, 1955  R. PIRAGINO  2,702,702

RESILIENT SUSPENSION FOR ROAD VEHICLES AND THE LIKE

Filed Aug. 15, 1949

Inventor
Renato Piragino
by Karl Michaelis, atty.

United States Patent Office 2,702,702
Patented Feb. 22, 1955

2,702,702

RESILIENT SUSPENSION FOR ROAD VEHICLES AND THE LIKE

Renato Piragino, Turin, Italy, assignor to RIV-Officine di Villar Perosa S. p. A., Turin, Italy Application August 15, 1949, Serial No. 110,282

Claims priority, application Italy January 29, 1949

2 Claims. (Cl. 267—63)

The present invention relates to a resilient support of the type comprising a relatively thick rubber sleeve placed between two concentric rigid members, for example of metal, of which the outer member is externally supported and the inner member is movable axially with respect to the outer member and is acted upon by the load.

It is an object of the invention to provide a resilient support of this type that is capable of considerable axial movement of the inner member relative to the outer member and is hence suitable for use as a satisfactory resilient suspension for a vehicle. It is a further object of the invention to provide a resilient suspension having a predetermined characteristics so that in light load conditions the relative displacement for each increment of load increase is small. In the normal working range, the displacement for each increment of load increase is greater than in the light load range and is approximately proportional to the load. In an overload range, the displacement for each increment of load increase becomes progressively smaller and the resistance of the resilient suspension to further displacement becomes progressively greater so that it satisfactorily withstands overload conditions.

In accordance with the invention, the rigid inner member comprises a base portion, a convergent portion projecting from the base and a cylindrical portion. The convergent portion is concavely curved in axial section and merges smoothly into the cylindrical portion. The rigid outer member is annular and surrounds the inner member with an annular space between the two members. The inner surface of the outer member is substantially conoidal with outwardly flared opposite end portions and a constricted intermediate portion, being smoothly convexly curved in axial section. The annular rubber sleeve interposed between the inner and outer rigid members and filling the space between them has an outer surface that is curved concavely in axial section and an inner surface that is convexly curved in axial section. The axial length of the rubber sleeve in engagement with the inner member is substantially less than the total length of the inner member and approximately equal to the axial length of the convergent portion of that member. A dome-shaped cap fixed on the end of the inner member with its convex face toward the end of the rubber sleeve has a diameter approximately equal to the diameter of the constricted portion of the outer member.

In the unloaded condition of the resilient support in accordance with the invention, the inner member is disposed with its cylindrical portion in the constricted portion of the outer member and with the larger end of its convergent portion projecting substantially beyond the corresponding end of the rubber sleeve. The convex face of the dome-shaped cap presses into the adjacent end portion of the rubber sleeve so as to prestress the sleeve in unloaded condition. As load is applied, the inner member moves axially with respect to the outer member to produce a rolling movement of the rubber sleeve in said outer member. As the convergent portion of the inner member moves progressively into the constricted intermediate portion of the outer member, the compression of the rubber sleeve between the inner and outer members is progressively increased. As load is applied, the dome-shaped cap moves progressively away from the adjacent end of the rubber sleeve and the base portion of the inner member approaches the opposite end of the sleeve and is adapted to engage the end portion of the sleeve in overload conditions. Preferably, the convergent portion of the inner member is tapered more gradually than the facing flared portion of the outer member so that the compressive effect on the rubber sleeve increases more gradually with increase of load as the inner member moves axially into the constricted portion of the outer member.

The objects and advantages of the invention will be more fully understood from the following description and claims in conjunction with the accompanying drawings which illustrate a preferred construction.

Figure 1:
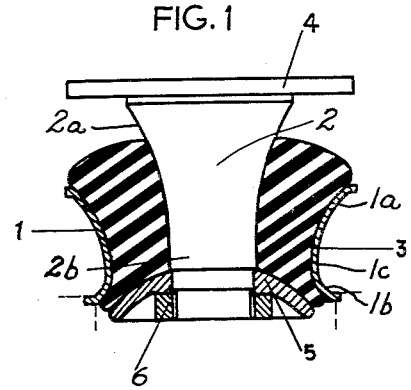
Fig. 1 is an axial section of a resilient support according to this invention in a non-loaded condition.

The resilient support as shown consists of an outer tubular member 1 which is secured, for instance, to the wheel axle of a rail vehicle, an inner member 2 connected to the load, for instance the body of the vehicle, and a rubber sleeve 3 interposed between the two members, preferably with a tight fit.

The surfaces of the two members 1 and 2 with which the rubber sleeve 3 cooperates are substantially conoidal, that is, they are formed by curved generatrices having their convexity turned towards the axis of the resilient support. The inner member 2 is provided on the end taking the load with a base portion in the form of a disc 4 adapted under higher loads to engage the adjacent end of the rubber sleeve, and on the opposite end with a dome-shaped disc 5 held in place by a nut 6 screwed onto a threaded end portion of the inner member 2. The diameter of the disc 5 is approximately equal to that of the constricted portion of the outer member.

Figure 2:
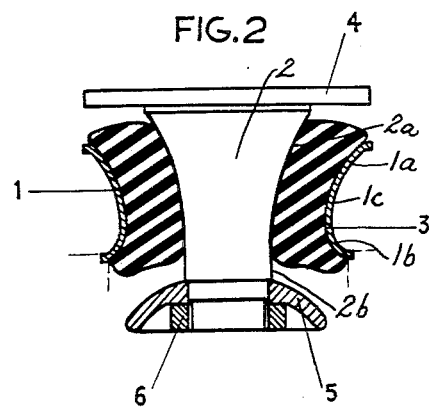
Fig. 2 shows the same resilient support to which a load exceeding the prestressing load has been applied.

As will be seen from Figs. 1 and 2, the outer member 1 has outwardly flared opposite end portions 1a and 1b and a constricted intermediate portion 1c, the inner surface of the outer member being smoothly convexly curved in axial section. The inner member 2 has a convergent portion 2a projecting from the base portion 4 and a cylindrical portion 2b. The convergent portion 2a is concavely curved in axial section and merges smoothly into the cylindrical portion. The rubber sleeve 3 filling the space between the inner and outer members has an outer surface that is curved concavely in axial section and an inner surface that is convexly curved in axial section. The rubber sleeve 3 bulges beyond both ends of the outer member 1 but the portion of the sleeve engaging the inner member 2 is substantially shorter than the inner member, being approximately equal to the axial length of the convergent portion 2a. Hence, the inner member projects from the rubber sleeve at one or both ends, depending on load conditions, as pointed out below.

In unloaded condition, as shown in Fig. 1, the inner member 2 is disposed with its cylindrical portion in the constricted portion 1c of the outer member, the plane of minimum diameter being indicated approximately by the plane a—a. The larger base end of the convergent portion 2a projects substantially above the upper end of the rubber sleeve. The convex surface of the disc 5 presses into the adjacent lower end portion of the rubber sleeve so as to draw the inner member firmly into the rubber sleeve and prestress said sleeve in unloaded condition.

As load is progressively applied, the inner member moves axially of the outer member to produce a rolling movement of the rubber sleeve between said members without slipping between the sleeve and members and a progressively increasing compression of the rubber sleeve between the convergent portion 2a of the inner member and the facing flared portion 1a of the outer member as said convergent portion moves progressively into the outer member and the rubber sleeve. During an initial portion of the downward movement of the inner member, the pressure of the convex disc 5 on the adjacent end of the rubber sleeve progresively decreases so as to relieve the preloading and continued movement of the inner member causes the disc 5 to move away from the rubber sleeve, as illustrated in Fig. 2. Under overload conditions, the base disc 4 approaches the upper end of the rubber sleeve and engages the sleeve if the overload exceeds a predetermined value.

In the preferred embodiment of the invention shown in the drawings, the convergent portion 2a of the inner member 2 tapers somewhat more gradually than the facing flared portion 1a of the outer member so that, in the unloaded condition represented in Fig. 1, the surfaces of the inner and outer members diverge upwardly, that is, they are more widely spaced at the upper end of the rubber sleeve than at the throat of the constricted portion of the outer member, as represented by the line a—a in Fig. 1. As load is applied to the inner member, the convergent portion of the inner member moves progressively into the constricted portion of the outer member, thereby gradually and progressively decreasing the space between the inner and outer members and thus applying increasing pressure to the rubber sleeve.

Figure 3:
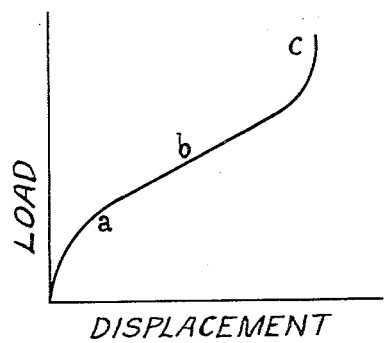
Fig. 3 shows a flexibility curve of this type of resilient support.

Fig. 3 shows the shape of the deformation (abscissae) and load (ordinate) curve of a resilient support of this type. Under a light load, below the prestressing load, flexibility is slight and deformation increases slowly with load (section a of the curve); under a load of ordinary values, the disc 5 is drawn away from the rubber sleeve, flexibility is normal and deformation increases more rapidly with load (section b of the curve); under a very high accidental load, while the disc 5 has been fully removed from the rubber sleeve, the disc 4 comes into contact therewith and flexibility is again reduced, deformation rises more slowly with load (section c of the curve).

It will be obvious that two or more resilient supports may be employed in a suspension in parallel, that is, side by side, or in series, that is, one axially behind the other, according to the various special requirements.

Constructional details, such as shape of the sleeve and members, may widely vary from what has been described and shown by way of example, without departing from the scope of this invention.

What I claim is:

1. In a resilient suspension for road vehicles and the like, the combination of a rigid inner member of circular cross section comprising a base portion, a convergent portion projecting from said base portion and a cylindrical portion, said convergent portion being concavely curved in axial section and merging smoothly into said cylindrical portion; an annular rigid outer member surrounding said inner member with an annular space between said members, the inner surface of said outer member being substantially conoidal with outwardly flared opposite end portions and a constricted intermediate portion and being smoothly convexly curved in axial section; an annular rubber sleeve interposed between said inner and outer members and filling the space between said members, said sleeve having an outer surface that is curved concavely in axial section and an inner surface that is convexly curved in axial section, the axial length of said sleeve in engagement with said inner member being substantially less than the length of said inner member and approximately equal to the axial length of the convergent portion of said inner member, and a dome-shaped cap fixed on the end of said inner member with its convex face toward said sleeve, said cap having a diameter approximately equal the diameter of the constricted portion of said outer member, said inner member in unloaded condition being disposed with its cylindrical portion in the constricted portion of the outer member and with the larger end of said convergent portion projecting substantially beyond the end of said sleeve and said cap pressing into the adjacent end portion of said sleeve to prestress said sleeve, and said inner member being movable axially of said outer member under load to produce first a rolling movement of the rubber sleeve between said members and then a progressively increasing compression of said sleeve between the convergent portion of the inner member and the facing flared portion of said outer member as said convergent portion moves progressively into said outer member and said sleeve and as said cap moves away from said adjacent end portion of said sleeve.

2. A resilient suspension according to claim 1, in which said convergent portion of said inner member is tapered more gradually than the facing flared portion of said outer member.

References Cited in the file of this patent

UNITED STATES PATENTS

| | | |
|---|---|---|
| 2,202,940 | Armington | June 4, 1940 |
| 2,462,011 | Thiry | Feb. 15, 1949 |

FOREIGN PATENTS

| | | |
|---|---|---|
| 327,801 | Great Britain | Apr. 17, 1930 |
| 355,333 | Italy | Dec. 29, 1937 |
| 407,788 | Great Britain | Mar. 29, 1934 |
| 466,354 | Great Britain | May 26, 1937 |
| 802,277 | France | June 6, 1936 |
| 917,013 | France | Sept. 2, 1946 |